E. E. GRAY.
EMERGENCY LEVER.
APPLICATION FILED AUG. 18, 1913.

1,270,408.

Patented June 25, 1918.

Witnesses:
W. F. Kilroy
Geo. E. Davison

Inventor:
Edward E. Gray
By Brown, Hopkins, Nissen & Sprinkle
Attys.

UNITED STATES PATENT OFFICE.

EDWARD E. GRAY, OF PLANO, ILLINOIS, ASSIGNOR TO GRAY PNEUMATIC GEAR SHIFT COMPANY, A CORPORATION OF ILLINOIS.

EMERGENCY-LEVER.

1,270,408.                      Specification of Letters Patent.      Patented June 25, 1918.

Application filed August 18, 1913. Serial No. 785,228.

*To all whom it may concern:*

Be it known that I, EDWARD E. GRAY, a citizen of the United States, residing at Plano, in the county of Kendall and State of Illinois, have invented certain new and useful Improvements in Emergency-Levers, of which the following is a specification.

This invention relates particularly to an emergency hand lever to be used in connection with a pneumatic gear shifting mechanism, and the principal object of the invention is to provide a device of this class which may be easily operated and placed in operation.

The invention consists in the features of novelty in the construction, combination and arrangement of the several parts generally shown in the accompanying drawing and described in the specification, but more particularly pointed out in the appended claims.

Figure 1:
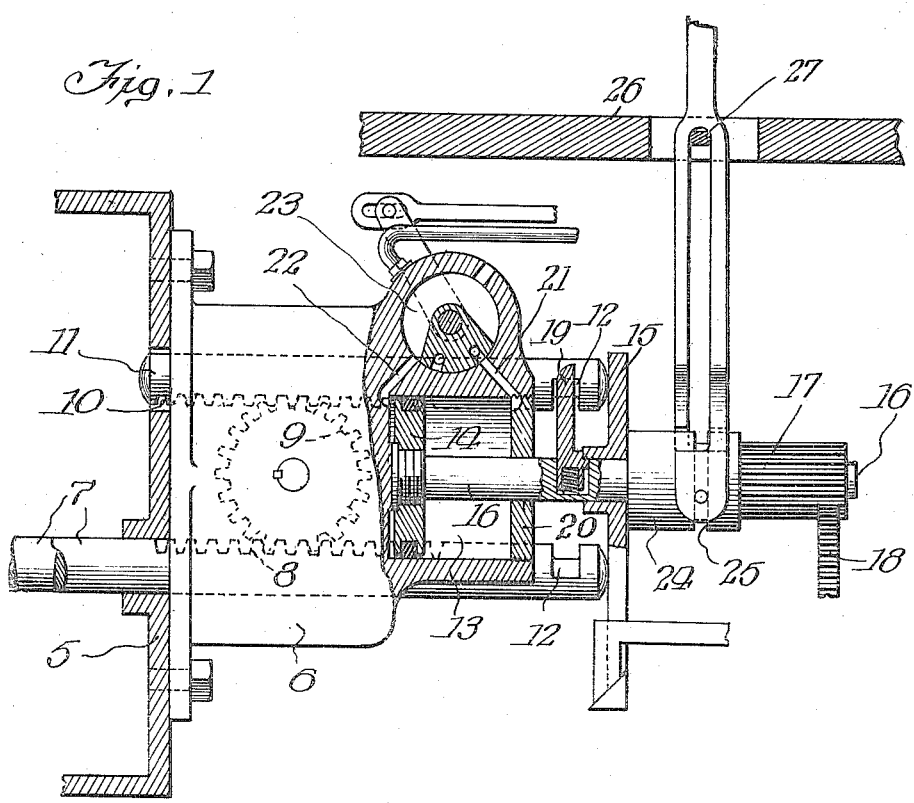
Figure 2:
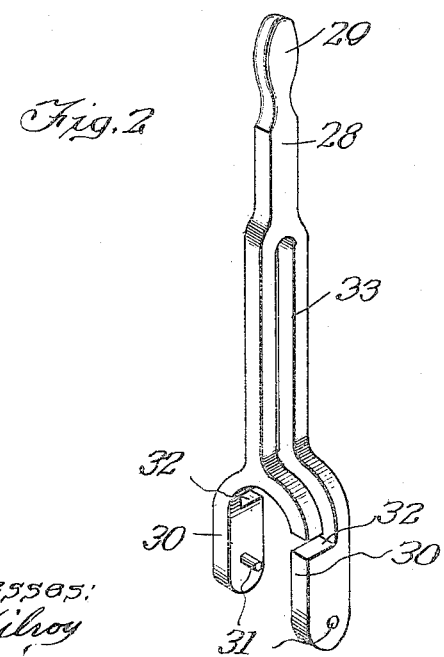

In the drawings, Figure 1 is a view partly in section illustrating the application of my invention to a pneumatic gear shifting mechanism; and Fig. 2 is a perspective view of the preferred form of lever.

In pneumatic gear shifting mechanism, such for example as that shown and described in my co-pending application for gear shifting mechanism, Serial No. 708,761, filed in the U. S. Patent Office on or about July 11, 1912, it may happen that some of the parts may become inoperative in the ordinary manner which will render it necessary that means be provided for effecting the gear shifting operation by means other than the pneumatic devices. The present invention exemplifies a manner for accomplishing this result.

A portion of a gear shifting mechanism to which the present invention is applicable is illustrated by Fig. 1, which comprises a transmission gear case 5 to which a supporting member 6 is secured. Extending through the gear case 5 are gear shifting rods 7 (only one being shown) having a rack portion 8 meshing with a pinion 9 and the pinion in turn meshing with a rack 10 of corresponding rods 11. These rods 7 and 11 are provided with notches 12 adjacent their outer extremity, and in the outer end of the member 6 is a cylinder 13 in which a piston 14 is movable. A cylinder head 15 closes the outer end of the cylinder and a piston rod 16 secured to the piston is movable and extends through the cylinder head. Mounted at the end of the rod 16 is a gear 17 with which a gear segment 18 meshes, by means of which the gear 17 and the piston rod 16 may be freely rotated in either direction. Mounted in a suitable recess in the shaft or rod 16 and rotatable with it is a dog 19 adapted to engage the notch 12 of either of the rods 7 and 11. Movable longitudinally with the shaft or rod 16 is a plate 20 which is adapted to engage the ends of the rods 7 and 11 to return them all to neutral when the piston rod is moved in one direction. The piston 14 and the rod 16 are moved longitudinally in the cylinder by fluid under pressure admitted through either of the ports 21 or 22, which are in turn controlled by a valve, designated generally by the reference numeral 23.

Interposed between the plate 20 and the gear 17 is a collar 24 having an annular notch 25. Disposed above the gear shifting mechanism is a support 26 in which a transverse bearing pin 27 is fixed.

During the normal operation of the gear shifting mechanism the piston will be reciprocated by means of fluid under pressure admitted through the ports at the ends thereof, and the different driving engagements are effected by rotating the dog 19 into engagement with the notch at the end of one of the rods. If the fluid pressure device is rendered inoperative for any reason some means must be provided for shifting the longitudinally movable rod 16 by some other means.

A lever 28 is provided with a hand-hold portion 29 at one end and with a yoke 30 at the other, the extremities of the yoke being provided with pins 31 which are adapted to engage the notch 25 of the collar 24. This lever is adapted to be pivoted to the pin 27 in any suitable manner.

A slot 32 opens from the opposite edges of the yoke and extends upwardly until they join where it continues toward the other end of the lever forming a fulcruming slot 33. In order to place this lever in position it is necessary only to place the yoke over the pin 27 until the lateral openings in the edges of the yoke register with the pin 27 and then to rotate the lever, causing the pin to ride into the slots, whereupon the lever may be pressed downwardly until the pin enters the fulcruming portion 33 of the slot, whereupon the yoke will be in position to engage the pins 31 with the annular notch in the collar 24. The gear 17 may then be operated for selectively operating the gear shifting rods 7, and the hand lever 28 is moved to effect the longitudinal movement of the rod 16 to effect the movement of the rods.

The gear shifting mechanism for which this lever is designed is particularly designed and adapted to be used in connection with automobiles, although, of course, it may have a more general use, and when so used the support 26 corresponds with the floor of the automobile.

What I claim is:

1. An emergency shifting lever comprising a hand hold at one end, a forked gripping device at the other, and an intermediate slotted portion in the handle and forks adapted to engage a fixed pivot pin at any distance from the end.

2. A removable lever having gripping means at one end and a slotted intermediate portion with slots extending from the sides of the forks by which the lever can be adjustably pivoted on any fulcrum pin.

3. A lever having a hand hold at one end, a releasable gripping device comprising a forked extremity at the other end, and a slotted intermediate portion extending in the handle and in both of the forks by means of which the lever can be adjustably pivoted on any fulcrum pin within the limits of the slot.

4. A lever having a yoke at the lower end and slots opening from opposite sides of the yoke and extending up the lever to form a continuous fulcruming slot.

5. A lever having a yoke at one end, with slots opening from opposite sides of the yoke and extending to and up the lever whereby the yoke can be placed over a fulcrum and the lever rotated and moved to engage the fulcrum in the lever portion of the slot.

In testimony whereof I have signed my name to this specification, in the presence of two subscribing witnesses, on this 13th day of August A. D. 1913.

EDWARD E. GRAY.

Witnesses:
ALLENA OFFUTT,
KENT W. WONNELL.